(12) United States Patent
Tardif (10) Patent No.: US 9,188,024 B2
(45) Date of Patent: Nov. 17, 2015

(54) EXHAUST SECTION FOR BYPASS GAS TURBINE ENGINES

(71) Applicant: Pratt & Whitney Canada Corp., Longueuil (CA)

(72) Inventor: Marc Tardif, Candiac (CA)

(73) Assignee: PRATT & WHITNEY CANADA CORP., Longueuil, QC (CA)

( * ) Notice: Subject to any disclaimer, the term of this patent is extended or adjusted under 35 U.S.C. 154(b) by 449 days.

(21) Appl. No.: 13/773,670

(22) Filed: Feb. 22, 2013

(65) Prior Publication Data

US 2014/0241863 A1    Aug. 28, 2014

(51) Int. Cl.
  *F01B 25/00* (2006.01)
  *F01D 25/24* (2006.01)
  *F02K 1/48* (2006.01)
  *F01D 11/00* (2006.01)
  *F02K 1/80* (2006.01)

(52) U.S. Cl.
  CPC .............. *F01D 25/24* (2013.01); *F01D 11/003* (2013.01); *F02K 1/48* (2013.01); *F02K 1/80* (2013.01); *F02K 1/805* (2013.01); *Y02T 50/671* (2013.01)

(58) Field of Classification Search
  CPC ......... F01D 25/24; F01D 11/003; F02K 1/48; F02K 1/80; F02K 1/805
  USPC ........................... 415/135, 136, 144, 145, 230
  See application file for complete search history.

(56) References Cited

U.S. PATENT DOCUMENTS

| 2,722,801 | A | 11/1955 | Lombard |
| 3,532,274 | A | 10/1970 | Wilkinson |
| 3,826,088 | A | 7/1974 | Nash et al. |
| 3,972,475 | A | 8/1976 | Nelson et al. |
| 4,071,194 | A | 1/1978 | Eckert et al. |
| 4,121,768 | A | 10/1978 | Young |
| 4,335,573 | A | 6/1982 | Wright |
| 4,452,038 | A | 6/1984 | Soligny |
| 4,637,550 | A | 1/1987 | Nash |
| 4,813,230 | A | 3/1989 | Braithwaite |
| 4,907,743 | A | 3/1990 | Bouiller et al. |
| 5,682,739 | A | 11/1997 | Weinstein et al. |
| 7,584,621 | B2 | 9/2009 | Spitzer et al. |
| 7,677,026 | B2 | 3/2010 | Conete et al. |
| 7,805,924 | B2 | 10/2010 | Alade et al. |
| 8,590,316 | B2 * | 11/2013 | Conete et al. ................... 60/770 |
| 2008/0060362 | A1 | 3/2008 | Poccia et al. |
| 2010/0126183 | A1 | 5/2010 | Conete et al. |

* cited by examiner

*Primary Examiner* — Ching Chang
(74) *Attorney, Agent, or Firm* — Norton Rose Fulbright Canada LLP (57) ABSTRACT

A turbine exhaust section comprises a turbine exhaust case having radially outer and inner ducts defining therebetween an annular exhaust portion for the hot exhaust gases, and an exhaust mixer projecting axially rearwardly from the turbine exhaust case for mixing the hot exhaust gases with a cooler bypass duct flow. The upstream end of the exhaust mixer surrounds a downstream end of the outer duct and defines therewith an axially extending overlap joint with a radial play between the outer duct and the exhaust mixer. A sliding attachment in the radial direction is provided between the outer duct and the exhaust mixer for accommodating differences in thermal growth during engine operation. The sliding attachment includes a circumferential array of sliding guides extending radially through the axially extending overlap joint. A resilient sealing ring seals the radial play between the outer duct and the exhaust mixer at the overlap joint.

20 Claims, 6 Drawing Sheets

EXHAUST SECTION FOR BYPASS GAS TURBINE ENGINES

TECHNICAL FIELD

The application relates generally to aircraft gas turbine engines and, more particularly, to an exhaust section for bypass gas turbine engines.

BACKGROUND OF THE ART

In bypass-type gas turbine engines, high velocity, high temperature gases from the engine core is mixed with low velocity, low temperature air from the bypass duct before being exhausted from the engine. Exhaust mixers are often integrated to the exhaust section of the engine in order to increase the mixing of the high and low velocity fluid flows. Typically, the exhaust mixer and the turbine exhaust case are made from the same high-temperature resistant material and are welded together at a butt joint. For certain applications, it would be advantageous to have the ability to use a different material in the manufacturing of the exhaust mixer. For instance, that could contribute to reducing the overall weight of the engine.

Therefore, there is a need for a new gas turbine exhaust section.

SUMMARY

In one general aspect, there is provided an exhaust section for a gas turbine engine of the type having an annular main gas path passage for channeling high temperature gases along an axis of the engine, and a bypass passage extending concentrically about the main gas path passage for axially channeling bypass air; the exhaust section comprising: a turbine exhaust case having radially outer and inner ducts defining therebetween an annular exhaust portion of the main gas path; an exhaust mixer projecting axially rearwardly from the turbine exhaust case, the exhaust mixer having an upstream end, a downstream end, and an annular wall extending axially therebetween and defining a plurality of circumferentially distributed alternating inner and outer lobes, the outer lobes protruding radially outwardly into the bypass passage and the inner lobes protruding radially inwardly into the main gas path passage, the upstream end of the exhaust mixer surrounding a downstream end of the outer duct of the turbine exhaust case and defining therewith an axially extending overlap joint with a radial play between the outer duct and the exhaust mixer along the overlap joint; a sliding attachment in the radial direction between the outer duct of the turbine exhaust case an the exhaust mixer, the sliding attachment including a circumferential array of sliding guides extending radially through the axially extending overlap joint; and a resilient sealing ring sealing the radial play between the outer duct of the turbine exhaust case and the exhaust mixer at the overlap joint.

In another aspect, there is provided an exhaust section for a bypass gas turbine engine having an annular main gas path passage for channeling high temperature gases along an axis of the engine, and a bypass passage surrounding the main gas path passage for axially channeling bypass air; the exhaust section comprising: a turbine exhaust case having radially outer and inner ducts defining therebetween an annular exhaust portion of the main gas path; an exhaust mixer extending rearwardly from the outer duct of the turbine exhaust case, the exhaust mixer having an upstream end, a downstream end, and an annular wall extending axially therebetween and defining a plurality of circumferentially distributed alternating inner and outer lobes, the outer lobes protruding radially outwardly into the bypass passage and the inner lobes protruding radially inwardly into the main gas path passage, the exhaust mixer and the turbine exhaust case being made out of different materials, the upstream end of the exhaust mixer surrounding a downstream end of the outer duct of the turbine exhaust case and defining therewith a radial play; a circumferential array of sliding guides extending radially outwardly from the downstream end of the outer duct of the turbine exhaust case and through a corresponding array of circumferentially distributed holes defined in the upstream end of the exhaust mixer, the sliding guides being free to slide in said holes when the outer duct thermally expand into said radial play, and a resilient radial seal disposed in said radial play in sealing engagement with the outer duct and the exhaust mixer.

DESCRIPTION OF THE DRAWINGS

Reference is now made to the accompanying figures, in which.

DETAILED DESCRIPTION

Figure 1:
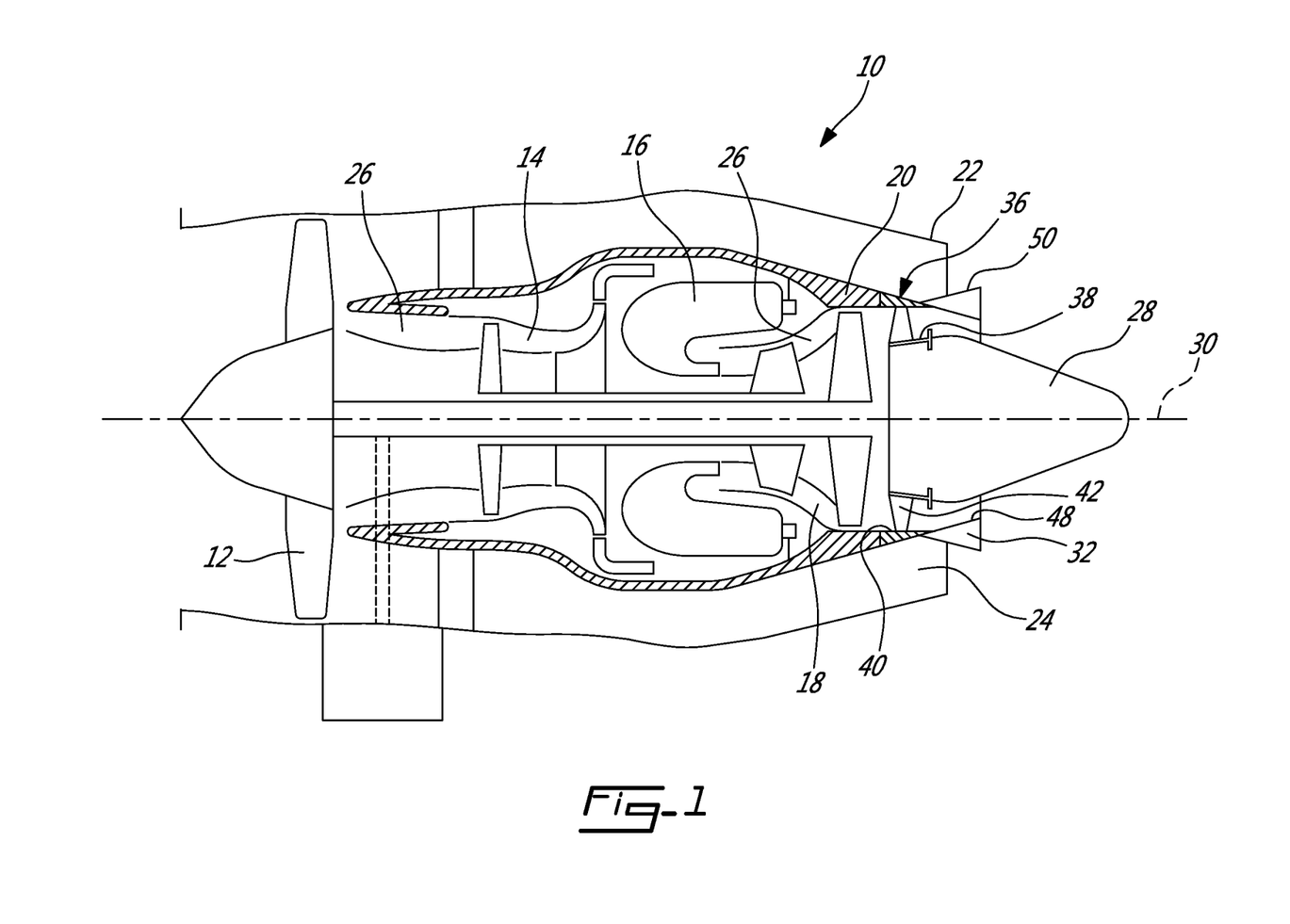
FIG. 1 is a schematic cross-sectional view of a turbofan gas turbine engine.

FIG. 1 illustrates a turbofan gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases.

The engine 10 has an inner casing 20 which encloses the turbo machinery of the engine, and a second, outer casing 22 surrounding the inner casing 20 such as to define an annular bypass passage 24 therebetween. The air propelled by the fan 12 is split into a first portion which flows around the first casing 20 within the bypass passage 24, and a second portion which flows through a main gas path 26 which is defined within the first casing 20 and allows the flow to circulate through the multistage compressor 14, combustor 16 and turbine section 18 as described above.

The inner casing 20 may comprise a turbine exhaust case (TEC) 36 disposed downstream of the last stage of low pressure turbine blades for receiving hot gases therefrom and exhausting the hot gases to the atmosphere. TEC 36 may comprise an inner duct 38 concentrically mounted about the central axis 30 of the engine, an outer duct 40 concentrically mounted about the central axis 30 and the inner duct 38, and a plurality of circumferentially spaced-apart struts 42 extending radially between the inner and outer ducts 38 and 40, thereby structurally connecting same. The inner and outer ducts 38 and 40 of the TEC 36 form a rear portion of the inner and outer flow boundary surfaces of the main gas path 26. The struts 42 typically have an airfoil profile to serve as vanes for directing the incoming flow of hot gases. In operation, the TEC 36 is exposed to high temperatures and, thus, the parts thereof, including the inner duct 38, the outer duct 40 and the struts 42 are made of high resistance temperatures materials. For instance, the TEC 36 may be made out of Nickel alloys (e.g. IN625). Other suitable heat resistant materials are contemplated as well.

At the aft of the engine, a tail cone 28 may be mounted to the rear end of the inner duct 38 of the TEC 36 centrally relative to the engine axis 30. The tail cone 28 defines a rearmost portion of the inner flow boundary wall of the main gas path 26 so that the combustion gases flow therearound downstream of the TEC 36. An annular exhaust mixer 32 surrounds at least a portion of the tail cone 28, the mixer 32 acting as a rearmost portion of the outer flow boundary wall of the main gas path 26 and as a rearmost portion of the inner wall defining the bypass passage 24. The hot combustion gases from the main gas path 26 and the cooler air from the bypass passage 24 are, thus, mixed together by the mixer 32 at the exit thereof such as to produce an exhaust with a reduced temperature.

Figure 2:
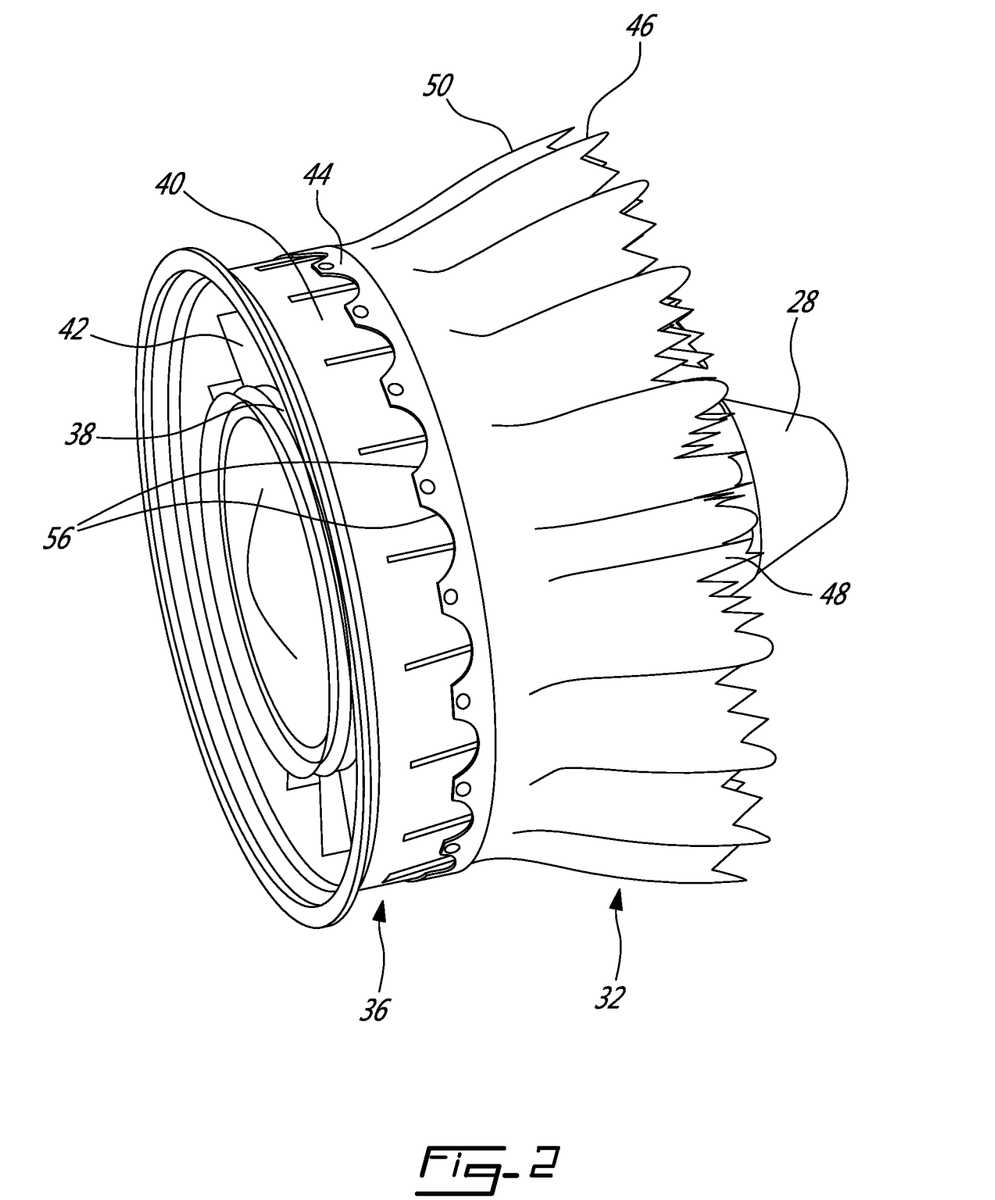
FIG. 2 is a front isometric view of a turbine exhaust case (TEC) and exhaust mixer assembly for forming a part of an exhaust section of a gas turbine engine such as shown in FIG. 1.

Referring to FIG. 2, the exhaust mixer 32 includes an annular wall defining an upstream end 44 of the mixer 32 along which the flows from the main gas path 26 and from the bypass passage 24 are received, and a downstream end 46 where the two flows meet and are mixed together. The annular wall defines a plurality of circumferentially distributed lobes between its upstream and downstream ends 44 and 46. The lobes include alternating inner and outer lobes 48, 50, with the outer lobes 50 extending into the bypass passage 24 and the inner lobes 48 extending into the main gas path 26. As such, the inner lobes 48 define troughs in the bypass passage 24 in between adjacent ones of the outer lobes 50, while the outer lobes 50 define troughs in the main gas path 26 in between adjacent ones of the inner lobes 48. In the embodiment shown, each lobe 48, 50 has a radially elongated cross-section including a rounded tip, and extends longitudinally between the upstream and downstream ends of the mixer 32.

In use, the mixer 32 is exposed to both the high temperature of the core flow and the colder bypass air flow. The mixer 32 is, thus, less thermally solicited than the TEC 36. This results in more material options for the exhaust mixer 32 than for the TEC 36. The overall weight of the engine could be reduced by using a material that is lighter in weight in comparison with the material used for the TEC 36. For instance, the exhaust mixer 32 could be made out of Titanium as opposed to Nickel based alloys, thereby providing for a lightweight exhaust mixer 32.

Figure 3:
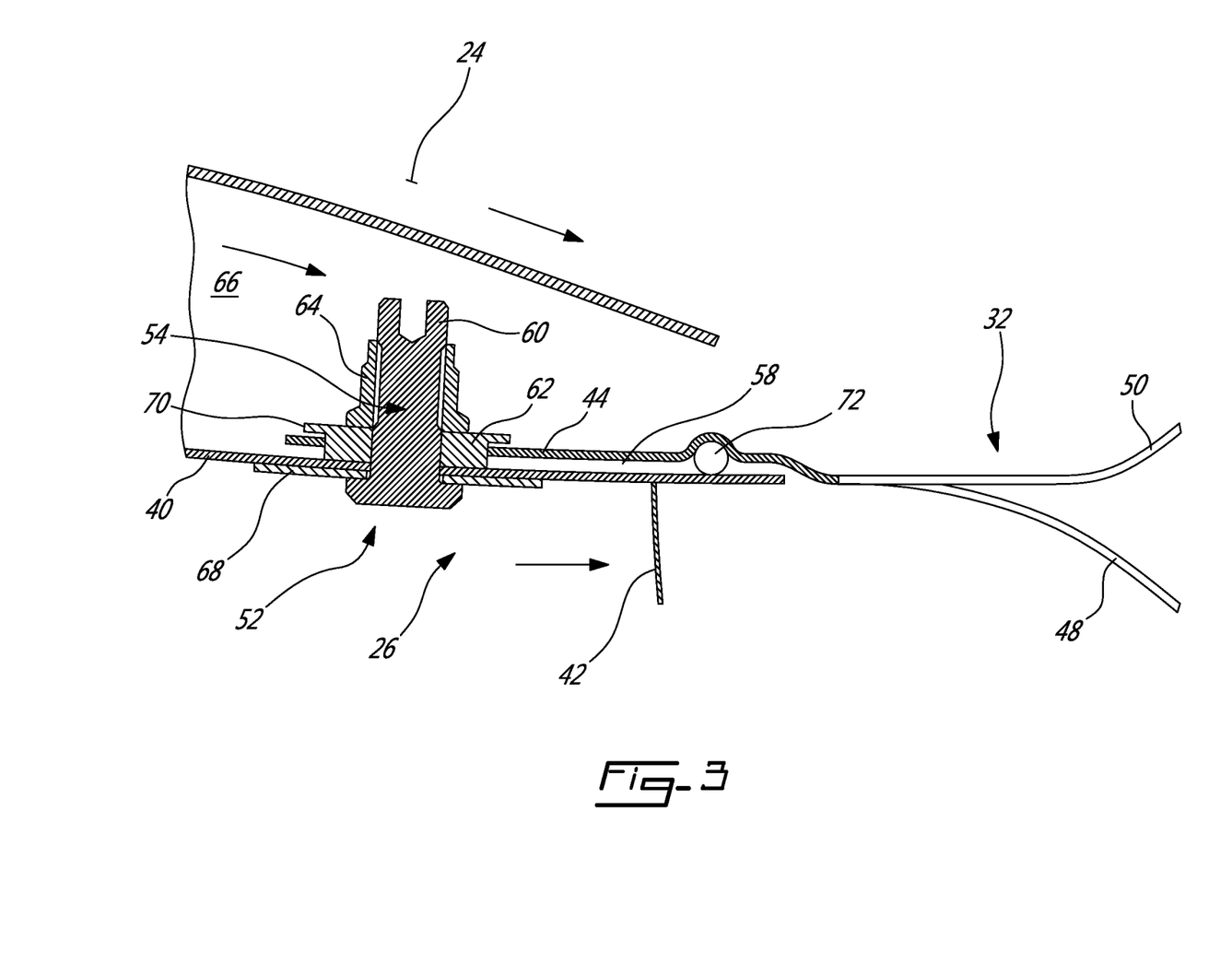
FIG. 3 is a cross-section view illustrating the details of a radial sliding attachment between the TEC and the exhaust mixer.
Figure 4A:
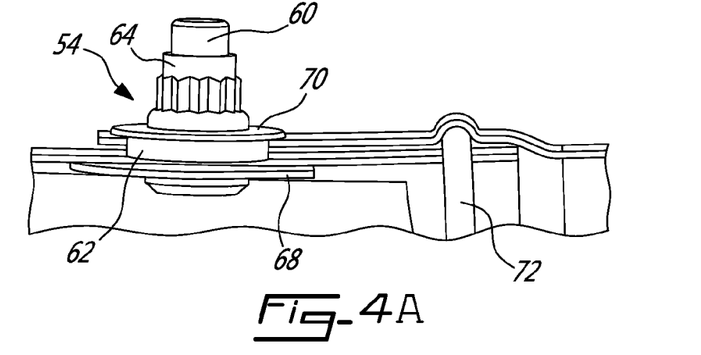
FIGS. 4a to 4c are isometric views of the sliding attachment shown in FIG. 3.
Figure 4B:
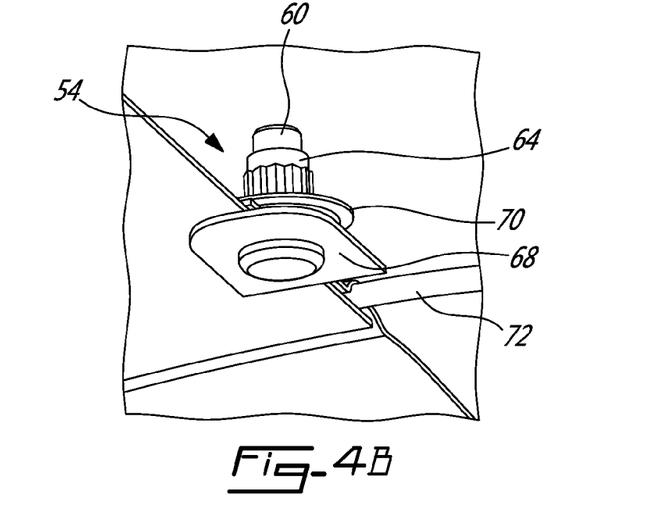
Figure 4C:
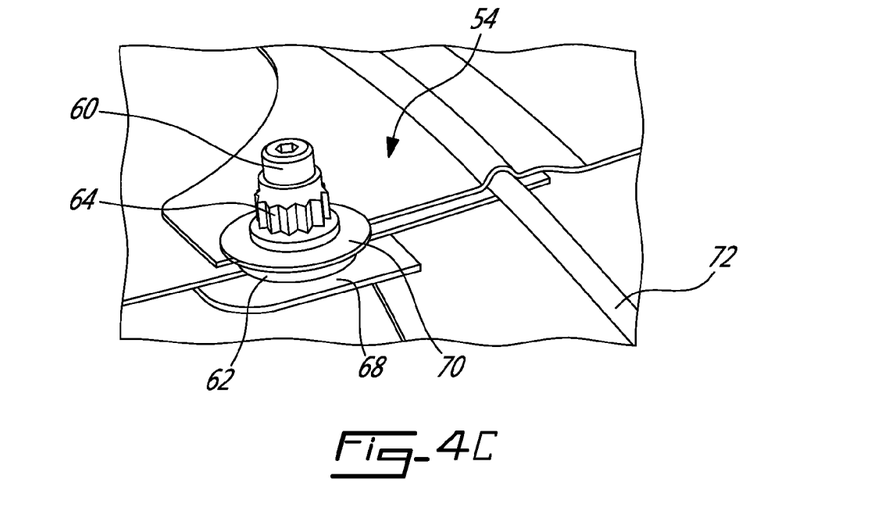

The mixer material substitution may be realized with a new mounting arrangement between the TEC and the exhaust mixer 32. FIGS. 2 to 4 illustrate an example of a mounting arrangement allowing for the difference in thermal growth between the TEC 36 and the exhaust mixer 32 during engine operation. According to the illustrated embodiment, a radial sliding attachment 52 is provided between the outer duct 40 of the TEC and the exhaust mixer 32. The radial sliding attachment 52 axially retains the exhaust mixer 32 on the outer duct 40 of the TEC 36 while allowing relative radial movement therebetween. The radial sliding attachment 52 may comprise a circumferential array of sliding guides 54 extending radially through an axially extending overlap joint between the upstream end 44 of the exhaust mixer 32 and the downstream end of the outer duct 40 of the TEC. Cut-outs 56 (FIG. 2) may be provided between adjacent points of attachment to provide additional weight reduction.

As shown in FIG. 3, the upstream end 44 of the exhaust mixer 32 axially extends over the downstream end of the outer duct 40 with a radial play 58 therebetween. The upstream end 44 of the exhaust mixer 32 is, thus, located on the cold side of the assembly that is radially outwardly with respect to the outer duct 40 of the TEC. The radial play 58 is provided to accommodate the difference in thermal growth between the outer duct 40 of the TEC and the mixer 32.

Referring concurrently to FIGS. 3, 4a, 4b and 4c, it can be appreciated that each sliding guide 54 may comprise a bolt 60, a sliding sleeve 62 mounted over the shank of the bolt 60 and a nut 64 threadably engaged with a radially outer threaded end portion of the shank of the bolt 60, the nut 64 maintaining the head of the bolt 60 and the sliding sleeve 62 in clamping engagement with radially inwardly and radially outwardly facing surfaces of the outer duct 40, respectively. The radially outer end of the bolt 60 and the nut 64 extend into a core cooling air flow passage 66 (FIG. 3) disposed radially inwardly relative to the air bypass passage 24. As can be appreciated from FIG. 3, there is very little space available in that area to add any radial mounting flange as such an additional mounting structure would significantly disrupt the air flows and the stiffness distribution near the trailing edge of the struts 42. The axial overlap joint overcomes that design constraint.

The sleeve 62 is mounted in sliding engagement in a hole defined in the upstream end of the mixer 32, thereby allowing the sliding guide assembly to move jointly with the outer duct 40 in the radial direction with respect to the exhaust mixer 32. A doubler plate 68 may be welded to the radially inner surface of the outer duct 40 of the TEC 36 to distribute the load of each bolt 60. Likewise, the sliding sleeve 62 may be provided with a flange 70 at its radially outer end. The flange 70 acts as a radial stopper/retainer. It prevents the mixer upstream end 44 from "falling off" the sliding sleeve 62 at assembly or in operation (excessive thermal differential growth). The flange is also helpful in distributing the load of the bolt 60 on the radially outer side of the exhaust mixer 32. The doubler plate 68 and the head of the bolt 60 are configured to minimize aero disturbance of the core flow. The bolt 60, doubler plate 68, the sliding sleeve 62 and the nut 64 are directly or indirectly exposed to hot core flow and as such they are made of a heat resistant material (e.g. IN625).

A radial seal 72 is provided in the radial play 58 to prevent ingestion of hot core gases. The radial seal 72 may be provided in the form of a resilient rope seal mounted in a circumferential groove defined in the radially inner surface of the upstream end of the exhaust mixer 32. The rope seal projects radially out of the groove, across the radial play, in sealing engagement with the radially outer surface of the outer duct downstream of the sliding guides adjacent to the downstream end of the outer duct 40. In use, the seal 72 will radially contract and expand back to its original state according to the heat growing cycle of the outer duct 40 of the TEC.

The sliding attachment between the outer duct 40 and the exhaust mixer 32 may be realized according to the following assembly sequence. The rope seal is first install in the groove. Then, the mixer 32 is axially slid over the downstream end of the outer duct 40 of the TEC. Thereafter, the bolts 60, the sliding guides 62 and the nuts 64 are installed. The nuts 64 are tightened while holding the bolts 60 from the outside with an appropriate tool, such as an Allen key.

Figure 5:
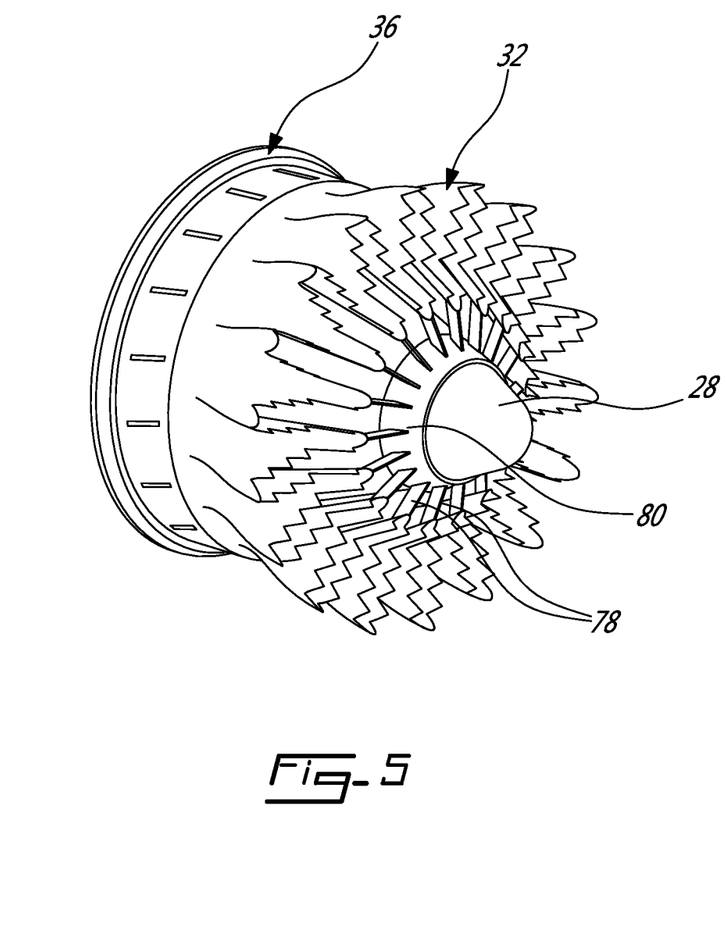
FIG. 5 is a rear isometric view of the TEC and exhaust mixer assembly showing inner-lobe radial supports that may be used to provide additional support to the exhaust mixer.

As shown in FIG. 5, in some instances, it may be desirable to provide some support to the downstream end of the mixer 32. The exhaust mixer 32 may be supported at its downstream end by a circumferential array of inner struts 78 extending radially outwardly from an inner ring 80 floatingly mounted to the inner duct 38 of TEC 36. The inner ring 80 is floatingly mounted to allow for differential thermal growth between the downstream end of the mixer 32 and the inner duct 38. The radial struts 78 and the inner ring 80 are exposed to the hot core flow only and, thus, they are made out of a heat resistant material. According to one embodiment, the inner ring 80 and the struts 78 are made of the same material as that used for the TEC (e.g. IN625). The struts 78 may be welded to the inner ring 80. However, since the exhaust mixer 32 is made of a different material (e.g. Titanium), the struts 78 cannot be welded to the exhaust mixer 32.

Figure 6:
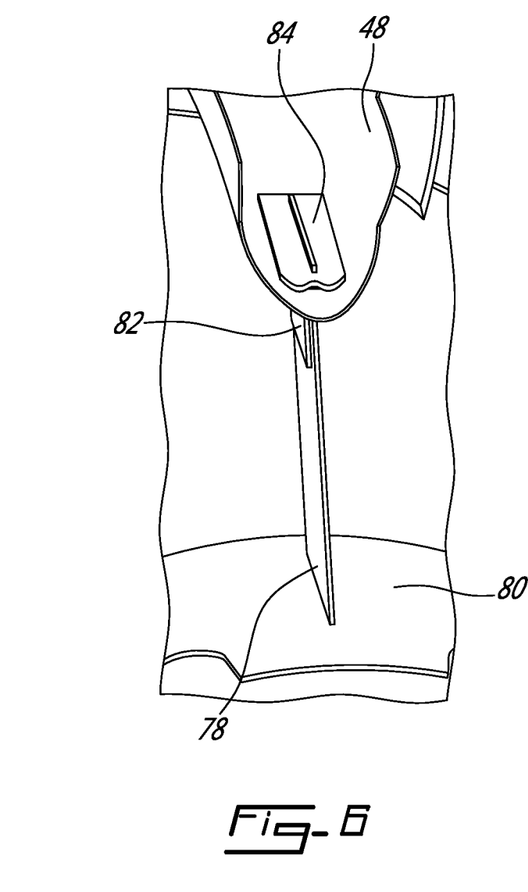
FIG. 6 is an enlarged isometric view illustrating the details of one of the inner-lone radial supports shown in FIG. 5.
Figure 7:
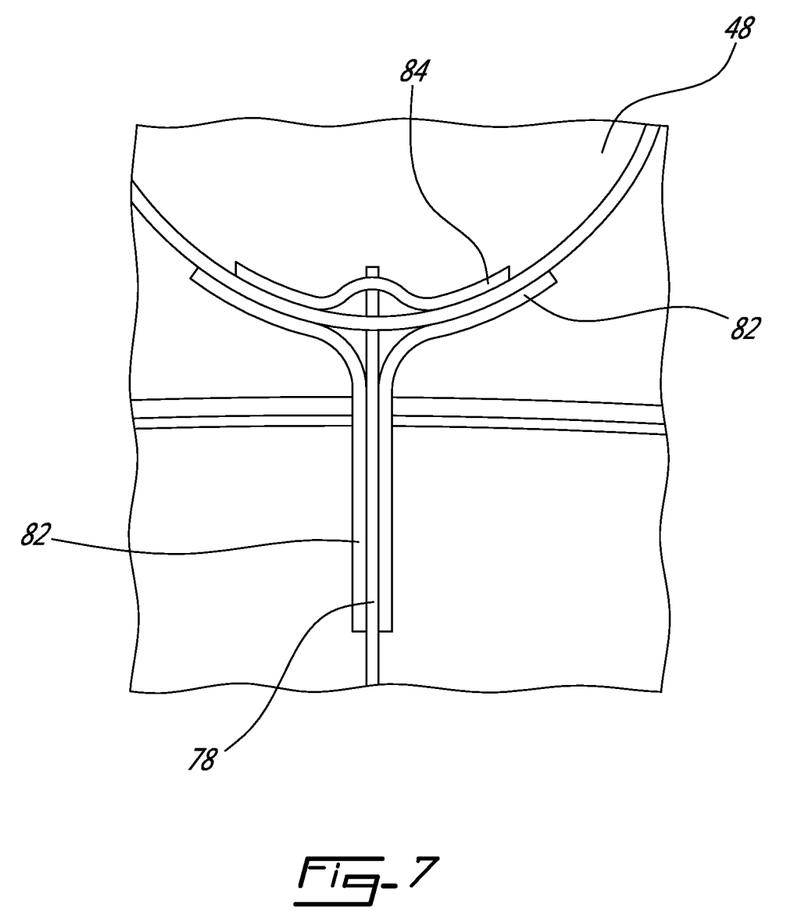
FIG. 7 is an enlarged rear end view of the inner-lobe radial support.

FIGS. 6 and 7 illustrate one possible interface between the support struts 78 and the inner lobes 48 of the exhaust mixer 32. Each radial strut 78 may be provided with a clamping arrangement at a radially outer end thereof for radial clamping engagement with an associated one of the inner lobes 48 of the mixer 32. Each radial strut 78 may extend radially through a slot defined in an associated one of the inner lobes 48 and be provided on the radially inner and outer sides of the inner lobe 48 with radially inner and outer clamping members. The radially inner clamping members may be provided in the form of a pair of side wings 82 extending laterally outwardly from opposed sides of the strut 78. The radially outer clamping member may be provided in the form of a radial stopper 84 projecting laterally outwardly from both sides of the strut 78. Both the radial stopper 84 and the side wings 82 may be welded to the associated strut 78.

The inner lobe-radial support structure may be manufactured according to the following sequence. First, the radial stoppers 84 can be welded to the radially outer end of the struts 78. Then, the struts 78 can be inserted from the radially outer side into the slots machined in the inner lobes 48 of the mixer 32. Thereafter, the side wings 82 can be welded to the struts 78 so as to appropriately preload the joint. Finally, the struts 78 may be welded at their radially inner ends to the inner ring 80.

As shown in FIG. 7, the radial stopper 84 is shaped to provide a uniform contact surface with the radially outer surface of the inner lobe 48. Indeed, the radial stopper 84 generally follows the tip curvature on the radially outer side of the inner lobe 48. The curvature of the side wings 82 is also selected to generally follow the curvature of the inner lobe 48, thereby providing a uniform bearing contact on the radially inner side of the lobe. The radial stopper 84 and the side wings 82 radially trap the tip portion of the inner lobe 48 in sandwich, thereby locally increasing the stiffness of the otherwise relatively flexible lobe structure of the mixer 32.

The above attachment methods not only allow for integration of materials having different thermal coefficients of expansion (to reduce thermally-induced stress) but also provide thermal isolation. Indeed, the material that has the lowest operating temperature limit (e.g. the low weight titanium mixer) is not exposed to the hot core flow only; it is always exposed to a colder flow as well, on its outer surface. The attachment features (such as the radial struts and the bolts) are made from high-temperature resistant material (e.g. nickel-based alloy materials) which can sustain exposure to the high temperature core flow.

The above description is meant to be exemplary only, and one skilled in the art will recognize that changes may be made to the embodiments described without departing from the scope of the invention disclosed. Alternate embodiments which are not shown include embodiment(s) where the radial sliding guides could be otherwise secured to the hotter inner component for joint movement in relation to the cooler outer component; embodiment(s) where the exhaust mixer is mounted to the turbine exhaust case of another type of bypass engine; and embodiments including two or more of these characteristics. Still other modifications which fall within the scope of the present invention will be apparent to those skilled in the art, in light of a review of this disclosure, and such modifications are intended to fall within the appended claims.

What is claimed is:

1. An exhaust section for a gas turbine engine of the type having an annular main gas path passage for channeling high temperature gases along an axis of the engine, and a bypass passage extending concentrically about the main gas path passage for axially channeling bypass air; the exhaust section comprising: a turbine exhaust case having radially outer and inner ducts defining therebetween an annular exhaust portion of the main gas path; an exhaust mixer projecting axially rearwardly from the turbine exhaust case, the exhaust mixer having an upstream end, a downstream end, and an annular wall extending axially therebetween and defining a plurality of circumferentially distributed alternating inner and outer lobes, the outer lobes protruding radially outwardly into the bypass passage and the inner lobes protruding radially inwardly into the main gas path passage, the upstream end of the exhaust mixer surrounding a downstream end of the outer duct of the turbine exhaust case and defining therewith an axially extending overlap joint with a radial play between the outer duct and the exhaust mixer along the axially extending overlap joint; a sliding attachment in a radial direction between the outer duct of the turbine exhaust case and the exhaust mixer, the sliding attachment including a circumferential array of sliding guides extending radially through the axially extending overlap joint; and a resilient sealing ring sealing the radial play between the outer duct of the turbine exhaust case and the exhaust mixer at the axially extending overlap joint.

2. The exhaust section defined in claim 1, wherein the sliding guides extends radially outwardly from the downstream end of the outer case and in sliding engagement in corresponding holes defined in the upstream end of the exhaust mixer.

3. The exhaust section defined in claim 2, wherein each of the sliding guides comprises a bolt having a shank and a head, a sliding sleeve mounted over the shank of the bolt and a nut threadably engaged with a threaded end portion of the shank of the bolt, the nut maintaining the head and the sliding sleeve in clamping engagement with radially inwardly and radially outwardly facing surfaces of the outer duct, respectively.

4. The exhaust section defined in claim 3, wherein the sliding sleeve is provided at a radially outer end thereof with a flange, the flange facing a radially outer surface of the exhaust mixer.

5. The exhaust section defined in claim 3, wherein a doubler plate is welded to a radially inner surface of the outer duct at each sliding guide locations, the doubler plate defining a hole in registry with a corresponding hole in the outer duct for receiving an associated one of the bolts.

6. The exhaust section defined in claim 1, wherein the resilient sealing ring is received in a groove defined in a radially inner surface of the upstream end of the exhaust mixer, the resilient sealing ring projecting radially out of the groove across the radial play in sealing contact with a radially outer surface of the outer duct of the turbine exhaust case.

7. The exhaust section defined in claim 6, wherein the resilient sealing ring is disposed axially downstream of the sliding guides relative to the flow high temperature gases.

8. The exhaust section defined in claim 6, wherein the resilient sealing ring is a rope seal.

9. The exhaust section defined in claim 1, wherein the inner lobes are supported by radial struts at the downstream end of the exhaust mixer, each radial strut being provided with a clamping arrangement at a radially outer end thereof for radial clamping engagement with an associated one of the inner lobes.

10. The exhaust section defined in claim 9, wherein the radial struts extend radially outwardly from an inner ring connected to the inner duct of the turbine exhaust case.

11. The exhaust section defined in claim 9, wherein the radial struts extend radially through respective slots defined in the inner lobes, wherein each radial strut has a pair of side wings for engagement with a radially inner surface of an associated one of the inner lobes and a radial stopper for engagement with a radially outer surface of the associated one of the inner lobes, the associated inner lobe being radially trapped between the radial stopper and the side wings.

12. The exhaust section defined in claim 11, wherein the radial stopper and the side wings are shaped to generally follow a curvature of an associated one of the inner lobes.

13. An exhaust section for a bypass gas turbine engine having an annular main gas path passage for channeling high temperature gases along an axis of the engine, and a bypass passage surrounding the main gas path passage for axially channeling bypass air; the exhaust section comprising: a turbine exhaust case having radially outer and inner ducts defining therebetween an annular exhaust portion of the main gas path; an exhaust mixer extending rearwardly from the outer duct of the turbine exhaust case, the exhaust mixer having an upstream end, a downstream end, and an annular wall extending axially therebetween and defining a plurality of circumferentially distributed alternating inner and outer lobes, the outer lobes protruding radially outwardly into the bypass passage and the inner lobes protruding radially inwardly into the main gas path passage, the exhaust mixer and the turbine exhaust case being made out of different materials, the upstream end of the exhaust mixer surrounding a downstream end of the outer duct of the turbine exhaust case and defining therewith a radial play; a circumferential array of sliding guides extending radially outwardly from the downstream end of the outer duct of the turbine exhaust case and through a corresponding array of circumferentially distributed holes defined in the upstream end of the exhaust mixer, the circumferential array of sliding guides being free to slide in said circumferentially distributed holes when the outer duct thermally expand into said radial play, and a resilient radial seal disposed in said radial play in sealing engagement with the outer duct and the exhaust mixer.

14. The exhaust section defined in claim 13, wherein the exhaust mixer and the turbine exhaust case are made of materials having different coefficients of thermal expansion, and wherein the material used for the exhaust mixer is lighter in weight in comparison to the material used for the turbine exhaust case.

15. The exhaust section defined in claim 14, wherein the turbine exhaust case is made of a high temperature resistant nickel based alloy, whereas the exhaust mixer is made of titanium.

16. The exhaust section defined in claim 13, wherein the exhaust mixer is supported at its downstream end by radial struts.

17. The exhaust section defined in claim 16, wherein the inner lobes of the exhaust mixer has a radially inner surface, and wherein the radial struts extend radially outwardly from an inner ring in support engagement with the radially inner surface of the inner lobes.

18. The exhaust section defined in claim 17, wherein side wings extend laterally from opposed sides of each of the radial struts to provide a radially inner bearing surface for the inner lobes of the exhaust mixer.

19. The exhaust section defined in claim 18, wherein a radial stopper is provided at a radially outer end of each of the radial struts, the inner lobes being radially trapped between the radial stoppers and the side wings.

20. The exhaust section defined in claim 19, wherein the radial struts, the inner ring, the side wings and the radial stoppers are made of the same material as that of the turbine exhaust case.

* * * * *